United States Patent
Li

(10) Patent No.: US 12,086,069 B2
(45) Date of Patent: Sep. 10, 2024

(54) MEMORY MANAGEMENT METHOD TO DETERMINE A FREQUENTLY ACCESSED PAGE AND ASSOCIATED TERMINAL DEVICE

(71) Applicant: HUAWEI TECHNOLOGIES CO., LTD., Guangdong (CN)

(72) Inventor: Changlong Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/920,513

(22) PCT Filed: Mar. 3, 2021

(86) PCT No.: PCT/CN2021/078938
§ 371 (c)(1),
(2) Date: Oct. 21, 2022

(87) PCT Pub. No.: WO2021/218370
PCT Pub. Date: Nov. 4, 2021

(65) Prior Publication Data
US 2023/0153246 A1 May 18, 2023

(30) Foreign Application Priority Data
Apr. 30, 2020 (CN) .......................... 202010367180.2

(51) Int. Cl.
*G06F 12/00* (2006.01)
*G06F 12/0882* (2016.01)
(Continued)

(52) U.S. Cl.
CPC ........ *G06F 12/0882* (2013.01); *G06F 12/123* (2013.01); *G06F 13/1689* (2013.01)

(58) Field of Classification Search
CPC ............... G06F 12/0882; G06F 12/123; G06F 13/1689; G06F 2212/1008;
(Continued)

(56) References Cited

U.S. PATENT DOCUMENTS 10,261,918 B2   4/2019  Liu et al.
2010/0199063 A1*  8/2010  Sechrest .............. G06F 12/121
                                                       711/204
(Continued)

FOREIGN PATENT DOCUMENTS

CN   104503740 A   4/2015
CN   105335306 A   2/2016
(Continued)

*Primary Examiner* — Arvind Talukdar
(74) *Attorney, Agent, or Firm* — HUAWEI TECHNOLOGIES CO., LTD.

(57) ABSTRACT

This application provides a memory management method and a terminal device. According to the method, a frequently accessed memory page and a rarely accessed memory page that are required for starting and using an application may be determined by using a memory page on which a page exception occurs in a target running application. A terminal retains, in a memory, the memory page that is required for starting and using the application, to resolve a problem that freezing occurs when an application that runs in a background is started again, and improve keepalive performance of the application. The terminal migrates the rarely accessed memory page to a swap partition of a storage, to save memory resources.

19 Claims, 8 Drawing Sheets

(51) Int. Cl.
*G06F 12/123* (2016.01)
*G06F 13/16* (2006.01)

(58) Field of Classification Search
CPC ..... G06F 2212/1016; G06F 2212/1044; G06F 12/122; G06F 12/08; G06F 12/0253
See application file for complete search history.

(56) References Cited

U.S. PATENT DOCUMENTS

| | | | |
|---|---|---|---|
| 2012/0260118 A1* | 10/2012 | Jiang | G06F 9/4893 713/340 |
| 2014/0189281 A1* | 7/2014 | Sokol, Jr. | G06F 12/08 711/171 |
| 2018/0063670 A1* | 3/2018 | Garg | H04W 4/60 |
| 2018/0307600 A1* | 10/2018 | Wang | G06F 12/02 |
| 2019/0205250 A1* | 7/2019 | Fang | G06F 9/445 |
| 2019/0220318 A1 | 7/2019 | Yang et al. | |

FOREIGN PATENT DOCUMENTS

| | | |
|---|---|---|
| CN | 105701025 A | 6/2016 |
| CN | 105808447 A | 7/2016 |
| CN | 103970256 B | 2/2017 |
| CN | 106557436 A | 4/2017 |
| CN | 106951291 A | 7/2017 |
| CN | 106980541 A | 7/2017 |
| CN | 108089998 A | 5/2018 |
| CN | 108205473 A | 6/2018 |
| CN | 108804207 A | 11/2018 |
| CN | 108932140 A | 12/2018 |
| EP | 3343369 B1 | 4/2020 |
| JP | 2018063505 A | 4/2018 |

\* cited by examiner

MEMORY MANAGEMENT METHOD TO DETERMINE A FREQUENTLY ACCESSED PAGE AND ASSOCIATED TERMINAL DEVICE

CROSS-REFERENCE TO RELATED APPLICATIONS

This application is a national stage of International Application No. PCT/CN2021/078938, filed on Mar. 3, 2021, which claims priority to Chinese Patent Application No. 202010367180.2, filed on Apr. 30, 2020. Both of the aforementioned applications are hereby incorporated by reference in their entireties.

TECHNICAL FIELD

This application relates to the field of terminal technologies, and in particular, to a memory management method and a terminal device.

BACKGROUND

Currently, a type and a quantity of mobile applications increase sharply, and memory required by these applications on increases year by year, which contradicts limited and expensive memory resources of a mobile device. When an application is switched to a background, memory occupied by the application is actually not released. To meet a memory requirement of a newly started application, a system performs a process killing or memory compression operation on the application in the background. However, excessive killing of a process decreases a keepalive capability of the application, and causes a series of side effects, for example, when the application in the background is started again, the application re-enters an advertisement interface, a start speed is slow, and historical user data is lost. Memory compression is another means for reclaiming the memory resources. A part of memory space can be saved by compressing a memory page in the memory. Memory compression essentially consumes resources of a central processing unit (central processing unit, CPU) to obtain the memory resources. Therefore, computing resource overheads are caused. In addition, a compression ratio of the memory compression operation is limited.

Currently, there is another manner of saving the memory resources. In this manner, a storage resource such as a UFS (UNIX file system) may be used to create a swap partition for the memory to use. When the memory is insufficient, some memory pages in the memory are migrated to the swap partition, to save the memory resources. A conventional page replacement algorithm reclaims a memory page based on a kernel LRU (least recently used, least recently used) linked list. Specifically, a system maintains an active linked list and an inactive linked list. A memory page that is not used for a long time is considered as a cold page and placed in the inactive linked list, and a memory page that is frequently used is considered as a hot page and placed in the active linked list. When memory reclamation is performed, that is, a swap (swap) operation is performed, the cold page in the inactive linked list is swapped out first. However, the page replacement algorithm has two defects. First, it takes a long time to determine the cold page and the hot page, and the cold page and the hot page cannot be actively filtered out in a short time. Second, determining the cold page and the hot page by using only time duration as a criterion is not completely accurate, and freezing still occurs when the application is switched back to a foreground.

SUMMARY

This application provides a memory management method and a terminal device, to accurately determine a frequently accessed memory page required for starting and using an application. When a target running application is switched to a background for running, the frequently accessed memory page is retained in a memory, to resolve a problem that freezing occurs when an application that runs in the background is started again, and improve keepalive performance of the application.

According to a first aspect, an embodiment of this application provides a memory management method. The method may be applied to a terminal device. The method includes: When a target running application is hot started, a terminal determines an application that runs in a background as the target running application. When the target running application is hot started, the terminal determines a frequently accessed memory page of the target running application based on a memory page on which a page exception occurs in the target running application. Finally, after the target running application is switched to the background for running, the terminal retains the frequently accessed memory page in a memory, and swaps a rarely accessed memory page from the memory to a swap partition of a storage.

In this embodiment of this application, in one aspect, according to the method, a frequently accessed memory page required for starting and using the application may be determined by using the memory page on which the page exception occurs in the target running application, and the terminal retains, in the memory, the memory page required for starting and using the application, to resolve a problem that freezing occurs when the application that runs in the background is started again, and improve keepalive performance of the application. In another aspect, according to the method, a rarely accessed memory page that is other than the frequently accessed memory page and that needs to be migrated to the swap partition can be accurately filtered out, and the terminal migrates the rarely accessed memory pages to the swap partition of the storage, to save memory resources.

In a possible design, a system kernel of the terminal determines the application that runs in the background as the target application, or a system kernel of the terminal determines the target running application based on an identifier that is of an application and that is set by a user.

In a possible design, that the target running application is hot started means that the target running application is switched from background running to foreground running. A start moment corresponding to hot start of the target running application may be a first moment at which a process of the target running application is started to be switched from background running to foreground running. The system kernel of the terminal may use a time period corresponding to second duration after the first moment as a time period corresponding to a hot start process. The second duration may be a specified threshold, or may be determined based on status information of the target running application.

In a possible design, it is assumed that when the target running application on the terminal is switched from foreground running to background running, the system kernel of the terminal compresses all or some memory pages of the application by using a memory compression operation. When the target running application is hot started, and when the target running application is decompressed, a decompressed memory page in the target running application is determined as the frequently accessed memory page of the target running application.

In this embodiment of this application, the terminal determines, from compressed data by using a decompression operation performed when the application is hot started, the frequently accessed memory page required for starting and using the application. In other words, the frequently accessed page required for starting and using the application can be accurately and actively filtered out by using an existing mechanism of the kernel, namely, memory compression and decompression, and cold and hot page identification does not need to be performed based on long-time historical information. Because the memory page required for starting and using the application is retained in the memory, the problem that the freezing occurs when the application that runs in the background is started again is resolved, the keepalive performance of the application is improved, and user experience is improved to some extent.

In a possible design, it is assumed that when the target running application on the terminal is switched from foreground running to background running, the terminal swaps some memory pages in the target running application from the memory. When the target running application is hot started, and when a memory page in the target running application is swapped to the memory, the memory page that is swapped to the memory and that is in the target running application is determined as the frequently accessed memory page of the target running application.

In this embodiment of this application, the terminal determines, by using a swap operation performed when the application is hot started, the frequently accessed memory page required for starting and using the application. Because the memory page required for starting and using the application is retained in the memory, the problem that the freezing occurs when the application that runs in the background is started again is resolved, the keepalive performance of the application is improved, and the user experience is improved to some extent.

In a possible design, it is assumed that when the target running application on the terminal is switched from foreground running to background running, the terminal demaps a memory page in the target running application. When the target running application is hot started, a remapped memory page in the target running application is determined as the frequently accessed memory page of the target running application.

In this embodiment of this application, the terminal determines, by using a remapping operation performed when the application is hot started, the frequently accessed memory page required for starting and using the application. Because the memory page required for starting and using the application is retained in the memory, the problem that the freezing occurs when the application that runs in the background is started again is resolved, the keepalive performance of the application is improved, and the user experience is improved to some extent.

In a possible design, when the target running application is decompressed, the terminal may mark the decompressed memory page in the target running application, and determine a marked memory page as the frequently accessed memory page of the target running application. Alternatively, when the swap operation is performed on the memory page in the target running application, the terminal may mark the memory page that is swapped to the memory and that is in the target running application, and determine a marked memory page as the frequently accessed memory page of the target running application. Alternatively, when the memory page in the target running application is remapped, the terminal may mark the remapped memory page in the target running application, and determine a marked memory page as the frequently accessed memory page of the target running application.

In this embodiment of this application, the terminal actively filters out, according to the foregoing method, the frequently accessed memory page required for starting and using the application, and does not need to identify cold and hot pages based on long-time historical information. Because the memory page required for starting and using the application is retained in the memory, the problem that the freezing occurs when the application that runs in the background is started again is resolved, the keepalive performance of the application is improved, and the user experience is improved to some extent.

In a possible design, another specific manner in which the terminal determines, based on the decompressed memory page, the frequently accessed memory page of the target running application is as follows: Whenever the target running application is hot started, the terminal marks a decompressed memory page in compressed data corresponding to the target running application.

The terminal determines the decompressed memory page based on mark information of the memory page. When the target running application is consecutively hot started for the $K^{th}$ time, the terminal determines a memory page whose quantity of times of being marked is greater than a specified threshold as the frequently accessed memory page of the target running application, and records a quantity of times of marking the memory page. In other words, the terminal determines the frequently accessed memory page of the target running application by analyzing a memory page that is decompressed during a plurality of times of consecutive hot start of the target running application. Compared with the foregoing manner, the frequently accessed memory page determined by this method is more accurate.

In a possible design, whenever the target running application is hot started, the terminal updates, from a first state to a second state, a state of a memory page used during running of the process of the target running application. The first state is a state in which the memory page of the target running application is marked when the target running application is switched to background running. The terminal determines, based on the second state, the memory page used during running of the process, and records a quantity of times that the memory page is marked as the second state.

Finally, when the target running application is consecutively hot started for the $K^{th}$ time, the terminal determines a memory page whose quantity of times of being marked is greater than a specified threshold as the frequently accessed memory page of the target running application. In other words, the terminal determines the frequently accessed memory page of the target running application by analyzing a memory page that is used during a plurality of times of hot start of the target running application. Compared with the foregoing manner, the frequently accessed memory page determined by this method is more accurate.

In a possible design, that the terminal retains the frequently accessed memory page in a memory, and swaps a rarely accessed memory page from the memory to a swap partition of a storage includes: The terminal performs a swap operation on a memory page of the target running application. The frequently accessed memory page is retained in the memory when the memory page of the target running application is the frequently accessed memory page. The rarely accessed memory page is swapped from the memory to the swap partition of the storage when the memory page of the target running application is the rarely accessed memory page. It can be learned that, according to the method, after the terminal accurately filters out the rarely accessed memory page that needs to be migrated to the swap partition, the terminal migrates the rarely accessed memory page to the swap partition of the storage in a timely manner, to save the memory resources. In this manner, memory space can be greatly expanded. In addition, the frequently accessed memory page required for starting and using the application can be filtered out, and the terminal retains, in the memory, the memory page required for starting and using the application, to resolve the problem that the freezing occurs when the application that runs in the background is started again, and improve the keepalive performance of the application.

In a possible design, after determining the frequently accessed memory page, the terminal swaps the frequently accessed memory page from the memory to the swap partition of the storage after running duration since the target running application is switched to the background for running reaches first duration. In this embodiment of this application, if a frequently accessed memory page is not used for a long time, the terminal may still migrate the frequently accessed memory page to the swap partition of the storage in a timely manner, to save the memory resources. In this manner, the memory space can be greatly expanded.

In a possible design, before the terminal migrates the rarely accessed memory page to the swap partition of the storage, the terminal determines whether input/output I/O of the memory is idle, and migrates the rarely accessed memory page from the memory to the swap partition of the storage only when the I/O of the memory is idle. In this embodiment of this application, the method helps reduce impact on performance of the terminal caused by I/O overheads at a memory page swap-out stage.

In a possible design, when the process of the target running application is killed, the system kernel of the terminal swaps the frequently accessed memory page from the memory to the swap partition of the storage. The method helps release the memory space in a timely manner, thereby saving the memory.

According to a second aspect, an embodiment of this application provides a terminal. The terminal includes a processor and a storage. The storage is configured to store one or more computer programs. When the one or more computer programs stored in the storage are executed by the processor, the terminal can implement the method in any possible design of the foregoing first aspect.

According to a third aspect, an embodiment of this application further provides an apparatus. The apparatus includes a module/unit for performing the method in any possible design of any one of the foregoing aspects. These modules/units may be implemented by hardware, or may be implemented by hardware by executing corresponding software.

According to a fourth aspect, an embodiment of this application further provides a computer-readable storage medium. The computer-readable storage medium includes a computer program. When the computer program is run on a terminal device, the terminal device is enabled to perform the method in any possible design of any one of the foregoing aspects.

According to a fifth aspect, an embodiment of this application further provides a computer program product. When the computer program product runs on a terminal, the terminal device is enabled to perform the method in any possible design of any one of the foregoing aspects.

According to a sixth aspect, an embodiment of this application further provides a chip. The chip is coupled to a storage, and is configured to execute a computer program stored in the storage, to perform the method in any possible design of any one of the foregoing aspects.

DESCRIPTION OF EMBODIMENTS

The following first explains and describes some terms in embodiments of this application, to facilitate understanding by a person skilled in the art.

(1) An application in embodiments of this application is referred to as an App for short, and is a software program that can implement one or more specific functions. Generally, a plurality of applications may be installed on a terminal device, for example, a camera application, a mailbox application, and a smart home device control application. The application mentioned in the following may be a system application installed on the terminal device before delivery, or may be a third-party application downloaded from the Internet or obtained from another terminal device by a user when using the terminal device.

(2) Cold start of an application is as follows: When the application is started, there is no process of the application in a system. In this case, the system creates a new process and allocates it to the application. Hot start of an application is as follows: When the application is started, there is a process of the application in the system. For example, if a Back button or Home button is tapped, the application exits, but the process of the application remains in a background. Compared with the cold start of the application, the hot start of the application does not involve a process of creating a process or loading resources. Therefore, a speed of the hot start of the application is much higher than a speed of the cold start.

(3) A memory may be a random access memory (RAM), a read-only memory (ROM), a cache (CACHE), or the like. A swap partition of a storage described in embodiments of the present invention belongs to an external storage. A storage space may include a flash memory (flash), a hard disk, an optical disc, a USB disk, a floppy disk, a tape drive, or the like. A computer program is usually stored in the external storage. Before performing processing, a processor loads the computer program from the external storage to the memory. The application in embodiments of the present invention is usually stored in the external storage. When running the application, the processor needs to load the application to the memory.

(4) Memory page: embodiments of this application relate to a page-based storage management solution. In the page-based storage management solution, a user process address space and a memory space are divided into areas of a same size, and allocation is performed in a unit of a memory page. Logically adjacent memory pages are not necessarily physically adjacent, and paging is completed by hardware of an operating system, which is clear to the user.

Figure 1:
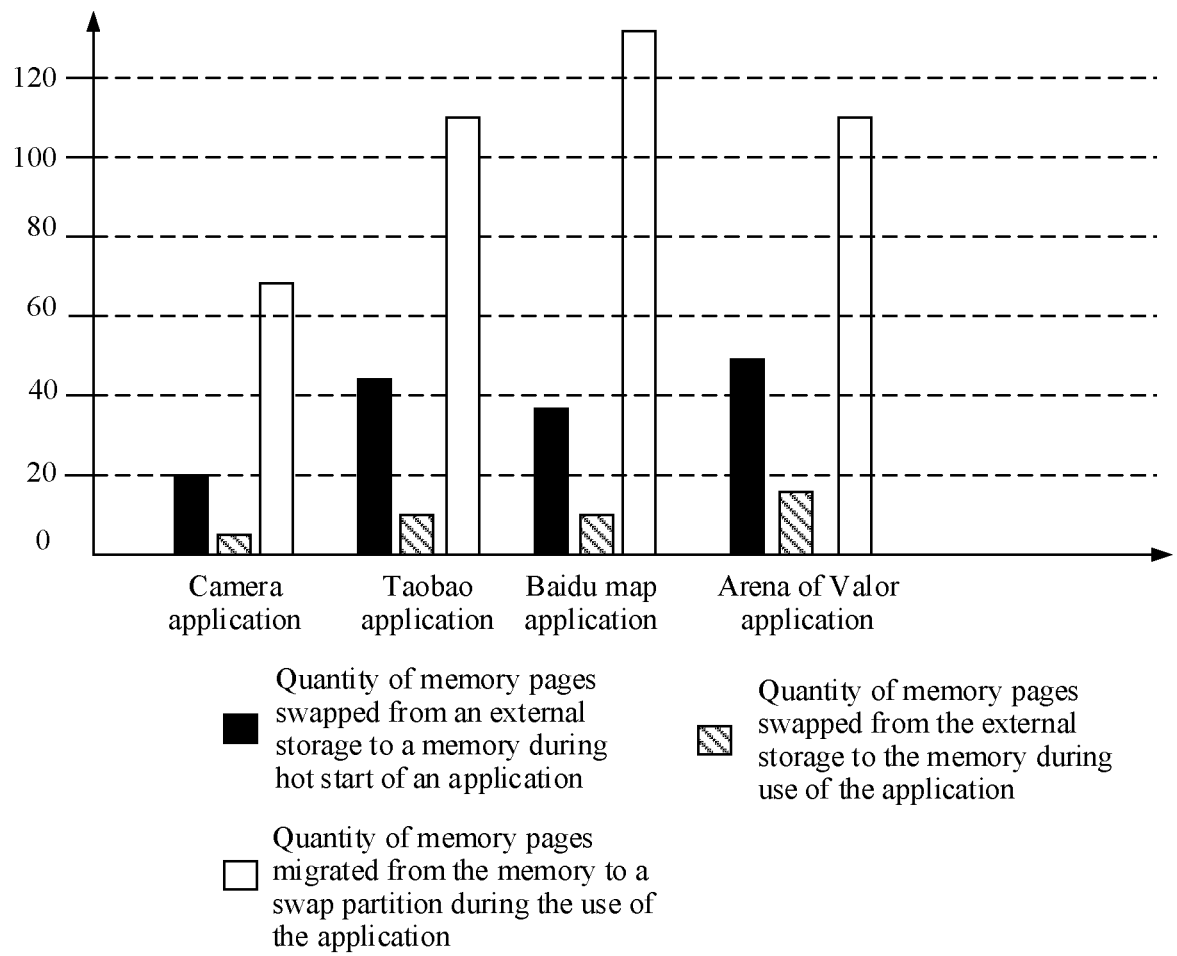
FIG. 1 is a schematic diagram of an application scenario according to an embodiment of this application.

According to statistics, the inventor finds that a large proportion of memory pages allocated to the application are rarely used in a subsequent hot start and deep use process of the application. FIG. 1 is an analysis bar chart of quantities of swapped-in and swapped-out memory pages of various applications at different stages. It can be learned from the figure that the quantity of swapped-in memory pages of the various applications at a start stage and in a use process are small, and a total quantity of swapped-out memory pages is large. An Arena of Valor® application is used an example. According to an actual test, the application actually needs approximately 600 MB of memory from starting the application to completing a game battle, namely, in a cold start process. However, more than half of data is not used again. A hot start process of the application needs less data. The memory page required for switching the Arena of Valor® from a background (namely, a non-game battle state) to a foreground (namely, a game battle state) for running is less than 100 MB. It can be learned that the various applications hoard, in a memory, a large quantity of memory pages that are rarely used or even no longer used. Based on this discovery, an embodiment of this application provides a memory resource management method. The method can determine a memory page that needs to be used when an application is switched from background running to foreground running, that is, can filter out a memory page (or "hot data") that needs to be used during start and deep use of the application, and a memory page (or "cold data") that is rarely used. The hot data is retained in the memory, and the cold data is swapped to the swap partition of the storage. According to the method, it can be ensured that the memory page that needs to be used during the start and the deep use of the application is retained in the memory. Therefore, a problem that freezing occurs when the application in the background is switched to a foreground for running can be solved. In another aspect, the memory page (or "cold data") that is rarely used and that is in the application is swapped from the memory, to effectively save memory resources.

To make objectives, technical solutions, and advantages of embodiments of this application clearer, the following describes the technical solutions in embodiments of this application in detail with reference to the accompanying drawings of the specification and specific implementations.

The embodiments disclosed in embodiments of this application may be applied to a terminal device. In some embodiments, the terminal device may be a portable terminal that includes functions such as a personal digital assistant and/or a music player, such as a mobile phone, a tablet computer, a wearable device (for example, a smartwatch) with a wireless communication function, or a vehicle-mounted device. An example embodiment of the portable terminal includes but is not limited to a portable terminal with iOS®, Android®, Microsoft®, or another operating system. Alternatively, the foregoing portable terminal may be a laptop computer (Laptop) having a touch-sensitive surface (for example, a touch panel), or the like. It should be further understood that in some other embodiments, the foregoing terminal may alternatively be a desktop computer having a touch-sensitive surface (for example, a touch panel).

Figure 2:
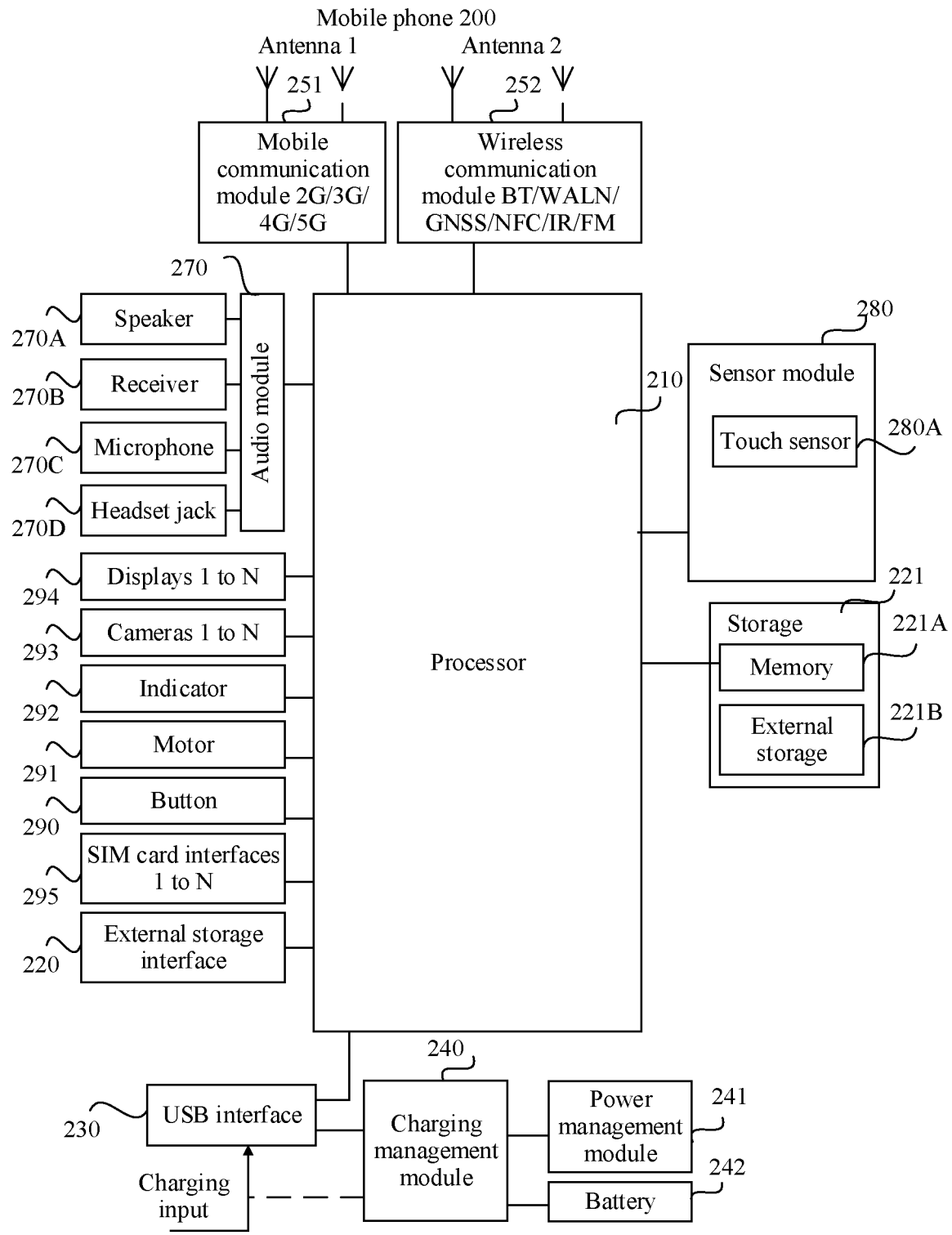
FIG. 2 is a schematic diagram of a structure of a mobile phone according to an embodiment of this application.

For example, the terminal device is a mobile phone. FIG. 2 is a schematic diagram of a structure of a mobile phone 200.

The mobile phone 200 may include a processor 210, an external storage interface 220, an internal storage 221, a USB interface 230, a charging management module 240, a power management module 241, a battery 242, an antenna 1, an antenna 2, a mobile communication module 251, a wireless communication module 252, an audio module 270, a speaker 270A, a receiver 270B, a microphone 270C, a headset jack 270D, a sensor module 280, a button 290, a motor 291, an indicator 292, a camera 293, a display 294, a SIM card interface 295, and the like. The sensor module 280 may include a touch sensor 280A (certainly, the mobile phone 100 may further include another sensor, such as a gyro sensor, an acceleration sensor, an optical proximity sensor, a fingerprint sensor, an ambient light sensor, a temperature sensor, a pressure sensor, a distance sensor, a magnetic sensor, an ambient light sensor, a barometric pressure sensor, or a bone conduction sensor, which is not shown in the figure).

It may be understood that a structure shown in this embodiment of the present invention does not constitute a specific limitation on the mobile phone 200. In some other embodiments of this application, the mobile phone 200 may include more or fewer components than those shown in the figure, combine some components, divide some components, or have different component arrangements. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a storage, a video codec, a digital signal processor (digital signal processor, DSP), a baseband processor, a neural-network processing unit (Neural-network Processing Unit, NPU), and/or the like. Different processing units may be independent components, or may be integrated into one or more processors. The controller may be a nerve center and a command center of the mobile phone 200. The controller may generate an operation control signal based on an instruction operation code and a time sequence signal, to complete control of instruction reading and instruction execution.

A storage may be further disposed in the processor 210, and is configured to store instructions and data. In some embodiments, the storage in the processor 210 is a cache storage. The storage may store instructions or data just used or cyclically used by the processor 210. If the processor 210 needs to use the instructions or the data again, the processor 210 may directly invoke the instructions or the data from the storage. This avoids repeated access, reduces waiting time of the processor 210, and improves system efficiency.

The processor 210 may run the memory management method provided in an embodiment of this application, to accurately determine a frequently accessed memory page required for starting and using an application, and a terminal retains, in a memory, a memory page required for starting and using the application, to resolve a problem that freezing occurs when an application that runs in a background is started again, improve keepalive performance of the application, and improve user experience. The processor 210 may include different components. For example, when a CPU and a GPU are integrated, the CPU and the GPU may cooperate to perform the memory management method provided in an embodiment of this application. For example, in the memory management method, some algorithms are executed by the CPU, and other algorithms are executed by the GPU, to obtain high processing efficiency.

The display 294 is configured to display an image, a video, or the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the mobile phone 200 may include one or N displays 294, where N is a positive integer greater than 1.

The display 294 is connected to a backlight driver IC 294A, and the backlight driver IC 294A is configured to control backlight brightness of the display 294. When the processor 210 (or a coprocessor in the processor 210) implements one backlight adjustment on the display 294, the processor 210 converts a target backlight brightness value in this adjustment into data in a specific format, and sends the data to the backlight driver IC 294A. After identifying the target backlight brightness value, the backlight driver IC 194A controls the backlight brightness of the display 294 to change, to adjust the backlight brightness of the display to the target backlight brightness value. The data in the specific format may be a pulse duty cycle (Pulse Width Modulation, PWM). In this embodiment of this application, the display 294 may be one integrated flexible display, or may be a spliced display including two rigid screens and one flexible screen located between the two rigid screens. After the processor 210 performs the memory management method provided in an embodiment of this application, the processor 210 may control the backlight brightness of the display 294.

The camera 293 (which may be a front-facing camera, a rear-facing camera, or a camera that may serve as both a front-facing camera and a rear-facing camera) is configured to capture a static image or a video. Usually, the camera 293 may include a photosensitive element such as a lens group and an image sensor. The lens group includes a plurality of lenses (convex lenses or concave lenses), and is configured to: collect an optical signal reflected by a to-be-photographed object, and transfer the collected optical signal to the image sensor. The image sensor generates an original image of the to-be-photographed object based on the optical signal.

The storage 221 generally includes a memory 221A and an external storage 221B. The memory 221A may be a random access memory (RAM), a read-only memory (ROM), a cache (CACHE), or the like. A preset storage space described in embodiments of the present invention belongs to the external storage 221B. The storage space may include a flash memory (flash), a hard disk, an optical disc, a USB disk, a floppy disk, a tape drive, or the like. A computer program is usually stored in the external storage 221B. Before performing processing, the processor loads the computer program from the external storage 221B to the memory 221A. An application in embodiments of the present invention is usually stored in the external storage. When running the application, the processor needs to load the application to the memory.

The external storage 221B includes the computer program that can implement the memory management method provided in an embodiment of this application, so that after the processor 210 reads a program of an operating system and runs the operating system, the operating system may have a memory management function provided in embodiments of this application. Further, the operating system may open an invoking interface for the memory management function to an application at an upper layer. After reading the application from the storage 221 and running the application, the processor 150 may invoke, through the invoking interface, the memory management function provided in the operating system, to implement memory management.

In addition, the memory 221A may include a high-speed random access memory, or may include a non-volatile memory, for example, at least one magnetic disk storage device, a flash memory, or a universal flash storage (universal flash storage, UFS).

Certainly, code of a memory management algorithm provided in embodiments of this application may alternatively be stored in an external storage. In this case, the processor 210 may run, through the external storage interface 220, code of a memory management algorithm stored in the external storage. The processor 210 may identify a frequently accessed memory page and a rarely accessed memory page, retain the frequently accessed memory page in the memory, and migrate the rarely accessed memory page to a swap partition of the external storage 221B.

The following describes functions of the sensor module 280.

The touch sensor 280A is also referred to as a "touch panel". The touch sensor 280A may be disposed on the display 294. The touch sensor 280A and the display 294 constitute a touchscreen that is also referred to as a "touch screen". The touch sensor 280A is configured to detect a touch operation performed on or near the touch sensor 280A. The touch sensor may transfer the detected touch operation to the application processor to determine a type of a touch event. The display 294 may provide a visual output related to the touch operation. In some other embodiments, the touch sensor 280A may alternatively be disposed on a surface of the mobile phone 200 and is located at a location different from that of the display 294. Other sensors such as a gyro, a barometer, a hygrometer, a thermometer, and an infrared sensor that can be configured for the mobile phone 200 are not described herein again.

A wireless communication function of the mobile phone 200 may be implemented by using the antenna 1, the antenna 2, the mobile communication module 251, the wireless communication module 252, the modem processor, the baseband processor, and the like.

The antenna 1 and the antenna 2 are configured to transmit and receive an electromagnetic wave signal. Each antenna in the mobile phone 200 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 251 may provide a solution that is applied to the mobile phone 200 and that includes wireless communications such as 2G, 3G, 4G, and 5G. The mobile communication module 251 may include at least one filter, a switch, a power amplifier, a low noise amplifier (low noise amplifier, LNA), and the like. The mobile communication module 251 may receive an electromagnetic wave through the antenna 1, perform processing such as filtering or amplification on the received electromagnetic wave, and transmit a processed electromagnetic wave to the modem processor for demodulation. The mobile communication module 251 may further amplify a signal modulated by the modem processor, and convert an amplified signal into an electromagnetic wave for radiation through the antenna 1. In some embodiments, at least some function modules of the mobile communication module 251 may be disposed in the processor 210. In some embodiments, at least some function modules of the mobile communication module 251 may be disposed in a same device as at least some modules of the processor 210.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 270A, the receiver 270B, and the like), or displays an image or a video by using the display 294. In some embodiments, the modem processor may be an independent component. In some other embodiments, the modem processor may be independent of the processor 210, and is disposed in a same component as the mobile communication module 251 or another function module.

The wireless communication module 252 may provide a solution that is applied to the mobile phone 200 and that includes wireless communications such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 252 may be one or more components integrating at least one communication processor module. The wireless communication module 252 receives an electromagnetic wave through the antenna 2, performs frequency modulation and filtering processing on an electromagnetic wave signal, and sends a processed signal to the processor 210. The wireless communication module 252 may further receive a to-be-sent signal from the processor 210, perform frequency modulation and amplification on the signal, and convert a processed signal into an electromagnetic wave for radiation through the antenna 2.

In addition, the mobile phone 200 may implement an audio function, for example, music playing and recording, by using the audio module 270, the speaker 270A, the receiver 270B, the microphone 270C, the headset jack 270D, the application processor, and the like. The mobile phone 200 may receive an input from the button 290, and generate a button signal input related to a user setting and function control of the mobile phone 200. The mobile phone 200 may generate a vibration prompt (for example, an incoming call vibration prompt) by using the motor 291. The indicator 292 in the mobile phone 200 may be an indicator light, may be configured to indicate a charging status and a power change, or may be configured to indicate a message, a missed call, a notification, and the like. The SIM card interface 295 in the mobile phone 200 is configured to connect to a SIM card. A SIM card may be inserted into the SIM card interface 295 or removed from the SIM card interface 295, to implement contact with or separation from the mobile phone 200.

It should be understood that during actual application, the mobile phone 200 may include more or fewer components than those shown in FIG. 1. This is not limited in this embodiment of this application. The mobile phone 200 shown in the figure is merely an example, and the mobile phone 200 may have more or fewer components than those shown in the figure, two or more components may be combined, or different component configurations may be used. The components shown in the figure may be implemented in hardware including one or more signal processing and/or application-specific integrated circuits, software, or a combination of hardware and software.

Figure 3:
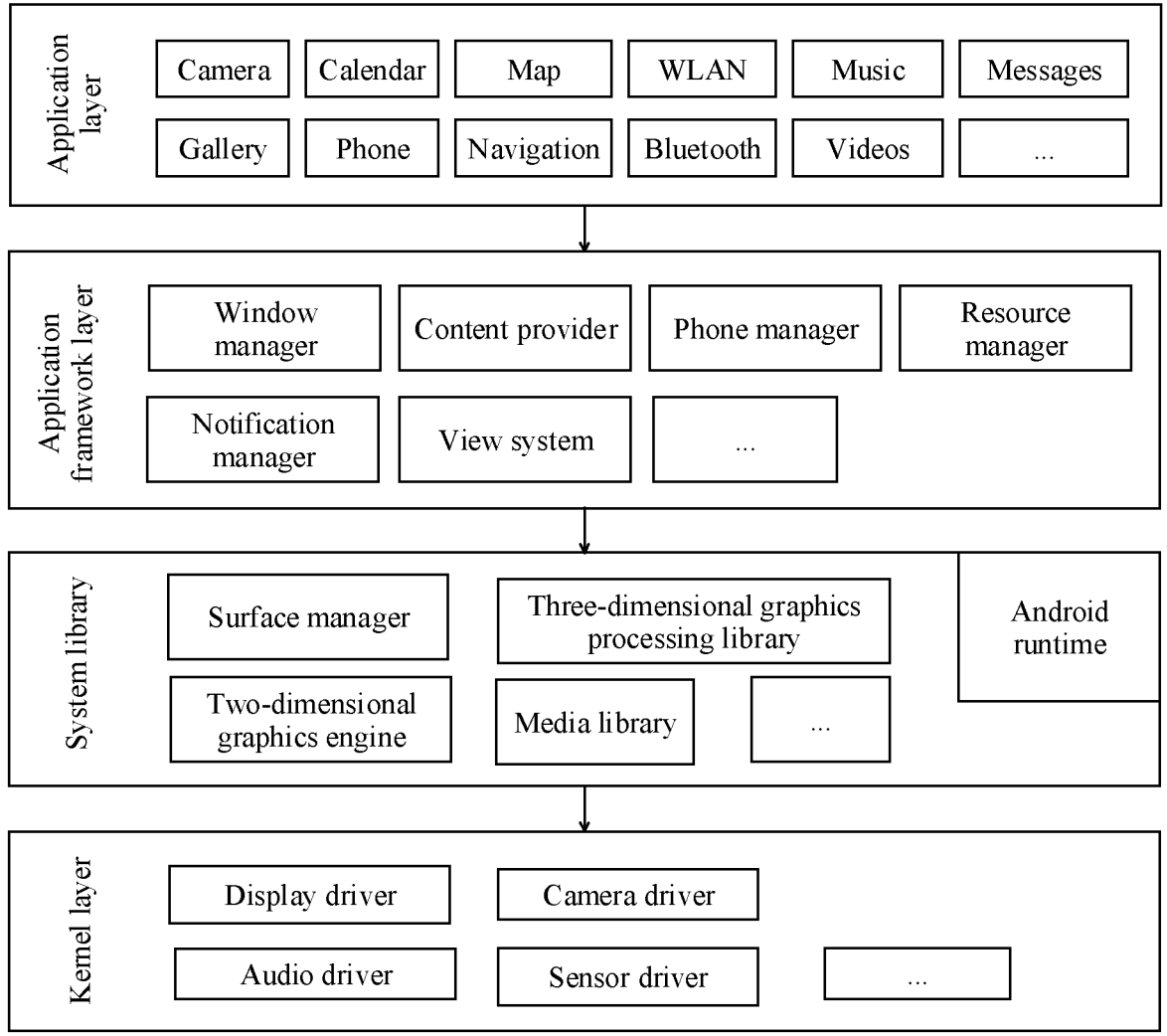
FIG. 3 is a schematic diagram of a structure of an Android operating system according to an embodiment of this application.

A software system of a terminal device may use a layered architecture, an event-driven architecture, a microkernel architecture, a micro service architecture, or a cloud architecture. In embodiments of the present invention, an Android system with a layered architecture is used as an example to describe a software structure of the terminal device. FIG. 3 is a block diagram of a software structure of a terminal device according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Dialer, Camera, Gallery, Calendar, Phone, Map, Navigation, WLAN, Bluetooth, Music, Videos, and Massages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application.

The data may include a video, an image, audio, dialed and answered calls, browsing history and bookmarks, a phone book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: a function that needs to be invoked in java language, and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 4:
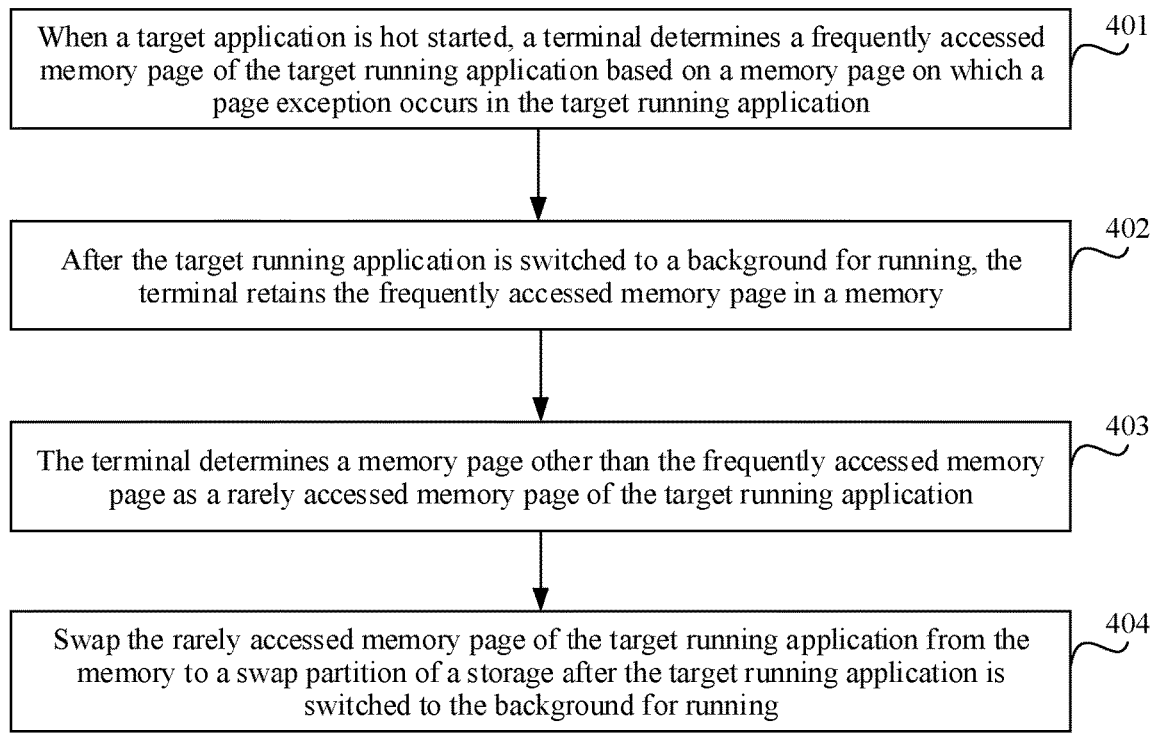
FIG. 4 is a schematic flowchart of a memory management method according to an embodiment of this application.

With reference to FIG. 4, the following describes a procedure of a memory management method according to an embodiment of this application. As shown in FIG. 4, the method specifically includes the following steps.

Step 401: When a target application is hot started, a terminal determines a frequently accessed memory page of the target running application based on a memory page on which a page exception occurs in the target running application.

In a possible implementation, the terminal may determine an application running in a background as the target running application. Specifically, a system kernel of the terminal may be provided with a daemon process. A framework layer of an operating system of the terminal listens to foreground-background switching information of an application. When the application running in the background is switched to a foreground for running, the framework layer sends a signal to the daemon process. After receiving the signal, the daemon process marks the target running application that is switched to the foreground for running. A specific marking manner may be implemented by adding a variable to a page structure (struct page). In this way, the terminal can determine that the target running application is hot started and runs in the foreground. A start moment corresponding to hot start of the target running application may be a first moment at which a process of the target running application is started to be switched from background running to foreground running. The system kernel of the terminal may use a time period corresponding to second duration after the first moment as a time period corresponding to a hot start process. The second duration may be a specified threshold, or may be determined based on status information of the target running application. For example, the status information may be status information of an activity component (Activity), start completion information, or the like.

In another possible implementation, the terminal device may receive a setting of a user in advance, and the terminal determines an application set by the user as the target running application. For example, the user may set, through an interaction interface of the terminal, that memory management needs to be performed on a WeChat® application. In this way, the WeChat® application is used as the target running application. When the WeChat® application is hot started, the terminal determines a frequently accessed memory page of the WeChat® application based on a memory page on which a page exception occurs in the WeChat® application.

In this embodiment of this application, the target running application is an application that can be switched between running in the foreground and running in the background. For example, an Arena of Valor® application is used as an example. When the user starts the Arena of Valor® application on a mobile phone and is in a battle state, if the mobile phone receives an incoming call, in a call process of the user, the Arena of Valor® application is switched to the background for running. In this case, the Arena of Valor® application is the target running application. For another example, in a running process of the WeChat® application, when the user touches a back (back) button or a home (home) button of the mobile phone, although the currently running WeChat® application exits, a process of the WeChat® application is still running in the background. In this case, the WeChat® application is the target running application. The system kernel of the terminal may determine a running status of an application by using a running task (RunningTaskInfo) class or a running application process (RunningAppProcessInfo) class in the system, to determine the application running in the background.

In addition, it should be noted that a process of an application that is switched to the background for running is usually not killed, but is temporarily stored in a memory and waits to be switched to the foreground for use next time. Generally, when a running application is switched from foreground running to background running, the system kernel of the terminal performs processing such as demapping, compression, or a swap operation on a memory page of the running application. For details, refer to any one of the following possible manners.

Manner A: When the target running application is switched from foreground running to background running, the system kernel of the terminal usually compresses a memory page of each process of the target running application, and retains a compressed memory page in the memory. In this manner, memory page compression can effectively increase an effective capacity of the memory, reduce a page failure rate, and improve bandwidth usage of the memory.

Figure 5A:
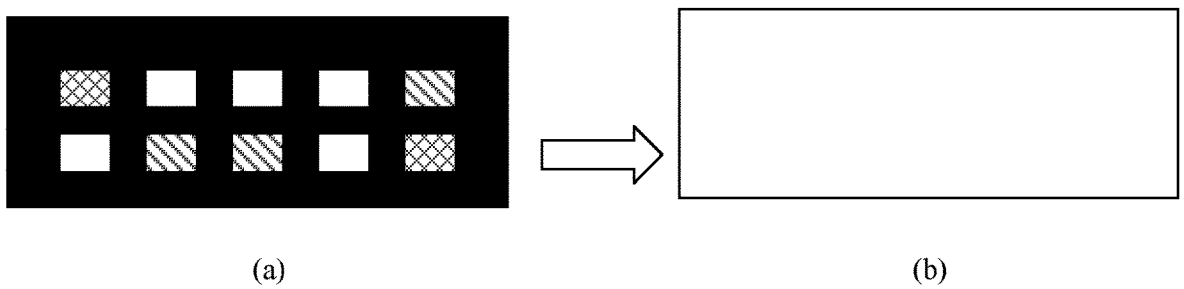
FIG. 5A is a schematic diagram of a memory page compression scenario according to an embodiment of this application.

For example, the Arena of Valor® application is still used as an example. An actual data volume (namely, a quantity of memory pages) required by the application from starting the application for the first time to completing a game battle is approximately 600 MB. When the Arena of Valor® application is switched from foreground running to background running, the system kernel of the mobile phone compresses a memory page of each process of the application. For example, as shown in FIG. 5A, the system kernel of the terminal may perform memory page compression on a memory page of each running process in the memory by invoking a compression algorithm, for example, LZ4. Compressed data is still retained in the memory (for example, occupies a compressed space shown in (b) in FIG. 5A). Compared with a memory space occupied by data before compression, a memory space (namely, the compressed space shown in FIG. 5A) occupied by the compressed data is smaller.

Manner B: When the target running application is switched from foreground running to background running, the system kernel of the terminal usually performs a swap operation on a memory page of each process of the application, that is, swaps some or all memory pages to a swap partition of a storage, to save the memory.

Figure 5B:
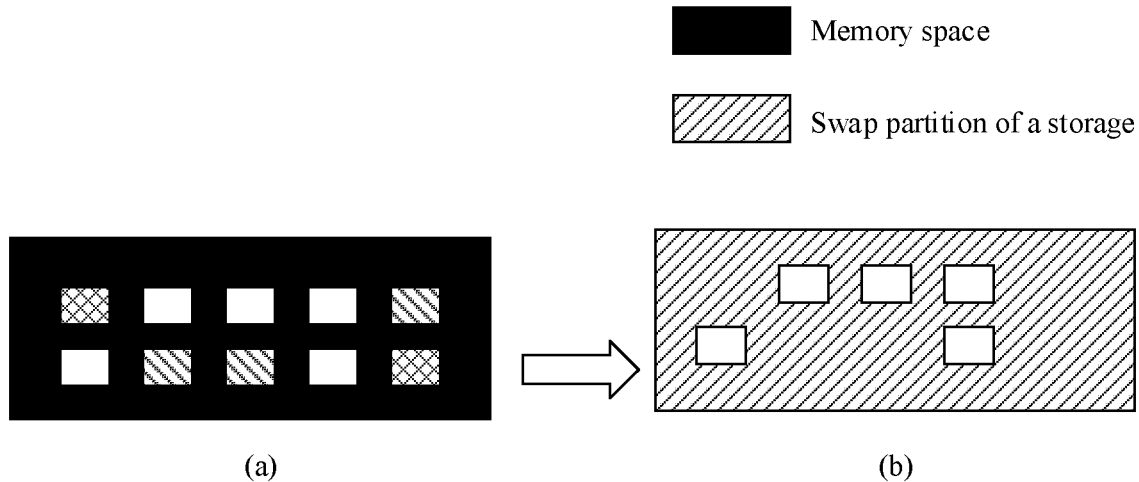
FIG. 5B is a schematic diagram of a memory page swapping scenario according to an embodiment of this application.

For example, the Arena of Valor® application is still used as an example. An actual data volume (namely, a quantity of memory pages) required by the application from starting the application for the first time to completing a game battle is approximately 600 MB. When the Arena of Valor® application is switched from foreground running to background running, the system kernel of the mobile phone performs a swap operation on a memory page of each process of the application. For example, as shown in FIG. 5B, the system kernel of the terminal swaps (swap) some memory pages of a running process in the memory. The swapped memory pages are migrated to a swap partition of a storage (for example, occupy a swap partition of a storage shown in (b) in FIG. 5B), to save the memory.

Manner C: When the target running application is switched from foreground running to background running, the system kernel of the terminal usually demaps a memory page of each process of the application, that is, cancels a mapping between a physical memory page and a virtual memory page.

For example, the Arena of Valor® application is still used as an example. An actual data volume (namely, a quantity of memory pages) required by the application from starting the application for the first time to completing a game battle is approximately 600 MB. When the Arena of Valor® application is switched from foreground running to background running, the system kernel of the mobile phone demaps a memory page of each process of the application.

In this embodiment of this application, when the target application is hot started, the system kernel of the terminal determines whether a memory page is mapped. If the memory page is not mapped, it is indicated that a page missing exception occurs. Therefore, a page exception interrupt program is triggered, and the page exception interrupt program determines a memory page on which a page exception occurs as a frequently accessed memory page. Specifically, the page exception interrupt program may be triggered in the following three manners. The terminal device may determine, in any one of the following three manners, the memory page on which the page exception occurs in the target running application.

Manner 1: It is assumed that when the running application is switched from foreground running to background running, the system kernel of the terminal performs processing described in Manner A on a memory page of the running application. When the target running application is hot started, the system kernel of the terminal decompresses a memory page of the target running application. When the target running application is switched from foreground running to background running, the memory page of the target running application is compressed. Therefore, the system kernel of the terminal determines that a decompressed memory page is not mapped. Therefore, a page exception interrupt program is triggered. The page exception interrupt program determines the memory page on which the page exception occurs as the frequently accessed memory page, that is, the system kernel of the terminal determines the decompressed memory page in the target running application as the frequently accessed memory page of the target running application.

Manner 2: It is assumed that when the running application is switched from foreground running to background running, the system kernel of the terminal performs processing described in Manner B on a memory page of the running application. When the target running application is hot started, the system kernel of the terminal performs a swap operation on a memory page of the target running application, that is, a memory page in the storage is swapped to the memory. When the target running application is switched from foreground running to background running, the memory page of the target running application is swapped to the storage. Therefore, the system kernel of the terminal determines that a memory page that is swapped to the memory is not mapped. Therefore, a page exception interrupt program is triggered. The page exception interrupt program determines the memory page on which the page exception occurs as the frequently accessed memory page, that is, the system kernel of the terminal determines the memory page that is swapped to the memory and that is in the target running application as the frequently accessed memory page of the target running application.

Manner 3: It is assumed that when the running application is switched from foreground running to background running, the system kernel of the terminal performs processing described in Manner C on a memory page of the running application. When the target running application is hot started, the system kernel of the terminal remaps a memory page of the target running application. When the target running application is switched from foreground running to background running, the memory page of the target running application is demapped. Therefore, the system kernel of the terminal determines that a memory page that is swapped to the memory is not mapped. Therefore, a page exception interrupt program is triggered. The page exception interrupt program determines the memory page on which the page exception occurs as the frequently accessed memory page, that is, the system kernel of the terminal determines the memory page that is swapped to the memory and that is in the target running application as the frequently accessed memory page of the target running application.

Step 402: After the target running application is switched to the background for running, the terminal retains the frequently accessed memory page in the memory.

Specifically, the terminal may listen to, by using the daemon process, whether the target running application is switched to the background for running. The system kernel of the terminal may be provided with the daemon process. The framework layer of the operating system of the terminal listens to the foreground-background switching information of the application. When an application running in the foreground is switched to the background for running, the framework layer sends a signal to the daemon process. After receiving the signal, the daemon process marks the target running application that is switched to the background for running. A specific marking manner may be implemented in a manner of adding a variable to a page structure (struct page). In this way, the terminal can determine that the target running application runs in the background. Further, the system kernel of the terminal retains the frequently accessed memory pages in the memory.

It should be noted that, in a possible case, when the target running application is switched to the background for running, the system kernel of the terminal may immediately perform a memory page swap operation on the target running application. In this case, that after the target running application is switched to the background for running may be understood to include a start moment at which the target running application is started to be switched to the background for running, and a time period after the start moment. Alternatively, in another possible case, when the target running application is switched to the background for running, the system kernel of the terminal may perform a memory page swap operation on the target running application after specified duration. That after the target running application is switched to the background for running may be understood as a time period after the specified duration from the start moment.

Step 403: The terminal determines a memory page other than the frequently accessed memory page as a rarely accessed memory page of the target running application.

Specifically, after marking the decompressed memory page in the target running application, the system kernel of the terminal determines an unmarked memory page in the target running application as the rarely accessed memory page of the target running application. Alternatively, after marking the memory page that is swapped to the memory and that is in the target running application, the system kernel of the terminal determines an unmarked memory page in the target running application as the rarely accessed memory page of the target running application. Alternatively, after marking the remapped memory page in the target running application, the system kernel of the terminal determines an unmarked memory page in the target running application as the rarely accessed memory page of the target running application.

Step 404: Swap the rarely accessed memory page of the target running application from the memory to the swap partition of the storage after the target running application is switched to the background for running.

In other words, after the target running application is switched to the background for running, the system kernel of the terminal performs a swap (swap) operation only on the rarely accessed memory page, and does not perform a swap operation on the frequently accessed memory page, that is, the frequently accessed memory page is retained in the memory. Alternatively, after the target running application is switched to the background for running, the system kernel of the terminal performs a compression operation only on the rarely accessed memory page, and does not perform a compression operation on the frequently accessed memory page. Alternatively, after the target running application is switched to the background for running, the system kernel of the terminal performs swap and compression operations only on the rarely accessed memory page, and does not perform swap and compression operations on the frequently accessed memory page. In other words, the swap operation in the foregoing step may be replaced with the swap and compression operations, or the compression operation. This is not limited in this embodiment of this application.

In a possible embodiment, if running duration since the target running application is switched to the background for running exceeds first duration (for example, two hours), the system kernel of the terminal may perform the swap operation on the frequently accessed memory page, for example, swap all or some memory pages from the memory to the swap partition of the storage, or perform the compression operation on the frequently accessed memory page.

In a possible embodiment, in Step 404, before the system kernel of the terminal migrates the rarely accessed memory page of the target running application from the memory to the swap partition of the storage, a processor of the terminal first determines whether an I/O (input/output) of the memory is idle. If the I/O (input/output) is idle, the system kernel of the terminal still stores the rarely accessed memory page in the memory in a compressed form. Once it is determined that the I/O is idle, the rarely accessed memory page is migrated to the swap partition of the storage.

In a possible embodiment, when the process of the target running application is killed, the system kernel of the terminal swaps the frequently accessed memory page from the memory to the swap partition of the storage, to save the memory.

The following further describes a system process of the foregoing memory management method by using an example with reference to Scenario 1 and Scenario 2.

Scenario 1

Figure 6:
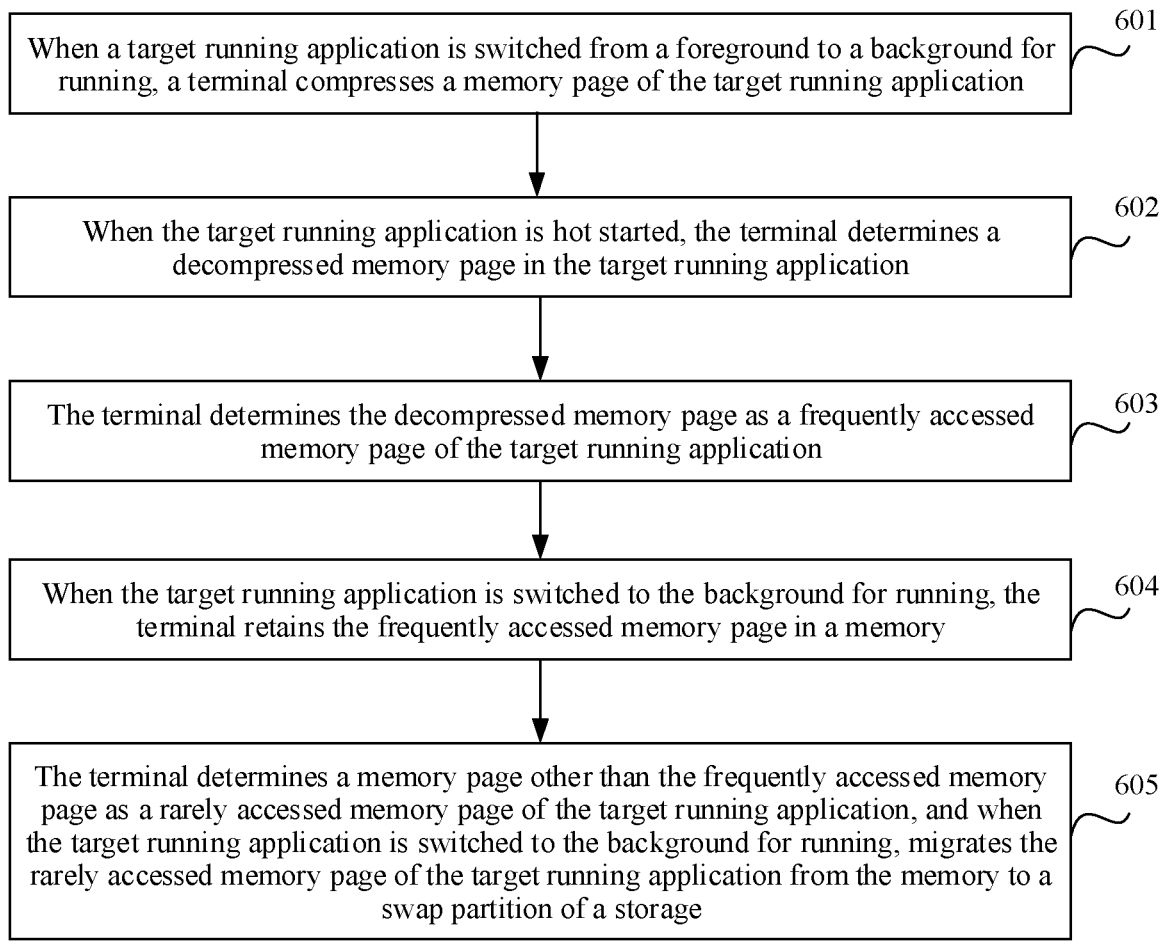
FIG. 6 is a schematic flowchart of a memory management method according to an embodiment of this application.

With reference to FIG. 6, a procedure of a memory management method according to an embodiment of this application is described. As shown in FIG. 6, the method specifically includes the following steps.

Step 601: When a target running application is switched from a foreground to a background for running, a terminal compresses a memory page of the target running application.

For example, the Arena of Valor® application is still used as an example. An actual data volume (namely, a quantity of memory pages) required by the application from starting the application for the first time to completing a game battle is approximately 600 MB. When the Arena of Valor® application is switched from foreground running to background running, a system kernel of a mobile phone compresses a memory page of each process of the application. For example, as shown in FIG. 5A, a system kernel of the terminal may perform memory page compression on a memory page of each running process in a memory by invoking a compression algorithm, for example, LZ4. Compressed data is still retained in the memory (for example, occupies a compressed space shown in (b) in FIG. 5A). Compared with a memory space occupied by data before compression, a memory space (namely, the compressed space shown in FIG. 5A) occupied by the compressed data is smaller.

Step 602: When the target running application is hot started, the terminal determines a decompressed memory page in the target running application.

Specifically, in the kernel, each memory page has a corresponding data structure. In this embodiment of this application, a special marker bit may be added to the data structure. A manner in which the terminal determines the decompressed memory page may be as follows: After the target running application is switched to the background for running for the first time, the system kernel of the terminal sets the special marker bit to 0. Alternatively, when the application is hot started, the system kernel of the terminal sets special marker bits corresponding to all decompressed memory pages to 1. In other words, when the target running application is switched from background running to foreground running, the system kernel of the terminal marks a memory page required for starting and using the application. The terminal device may determine the decompressed memory page based on mark information.

In another possible embodiment, in this application, a first marker bit whose attribute is an enumerated value may be further defined in the data structure corresponding to each memory page. Whenever the target running application is hot started, the system kernel of the terminal increases the enumerated value corresponding to a re-decompressed memory page. Until the target running application is consecutively hot started for the $(K+1)^{th}$ time, the enumerated value of the memory page of the target running application is zeroed out. For example, an initial value of the first marker bit is 0. When the target running application is hot started for the first time, if a first memory page is decompressed from compressed data, the first marker bit corresponding to the memory page is set to 1. When the target running application is hot started for the second time, if the first memory page is decompressed from the compressed data again, the first marker bit corresponding to the memory page is set to 2. The terminal device may determine a memory page corresponding to a non-zero first marker bit as the decompressed memory page.

It should be noted that, in actual application, a start manner of an application includes cold start and hot start. The cold start is as follows: The terminal does not run a related process of a to-be-started application in a background. Therefore, when the application is started, an Application class is first created and initialized, and then a MainActivity class (including a series of measurement, layout, drawing, and the like) is created and initialized, and then related information of the application is output to a user. The hot start is as follows: The terminal runs the related process of the to-be-started application in the background. Therefore, when the application is started, the Application class does not need to be created and initialized, but the MainActivity class is directly created and initialized, and then the related information of the application is output to the user. There are other possibilities for a preset rule, and examples are not given one by one herein again.

In addition, the memory page may include an anonymous page, a file page, and the like. This is not limited herein. The anonymous page refers to a page without a file background, for example, a heap, a stack, or a data segment. The file page refers to a page with a file background, and a cache generated in a memory after a program reads a file. The file page is also referred to as a file cache. It should be noted that the compressed data includes an anonymous memory page, a file memory page, and the like that are generated during running of a process of the target running application.

In this step, if the target running application is hot started, some processes are executed. Therefore, a memory page that is in the compressed data and that is related to the process is decompressed. Therefore, in this application, the memory page required for starting and using the application can be accurately and actively filtered out through hot start of the application. Compared with a conventional solution in which cold and hot page identification is performed based on long-time historical usage information, the solution provided in this application is timelier and more effective.

Step 603: The terminal determines the decompressed memory page as a frequently accessed memory page of the target running application.

A first method for determining the frequently accessed memory page of the target running application may be as follows: The terminal device determines, as the frequently accessed memory page of the target running application, the memory page that is decompressed in this hot start.

In addition, a second method for determining the frequently accessed memory page of the target running application may be as follows: When the terminal is consecutively hot started for the $K^{th}$ time, the system kernel of the terminal determines, based on information about the first marker bit of the memory page, a memory page whose quantity of times of being marked is greater than a specified threshold as the frequently accessed memory page. In other words, the system kernel of the terminal determines the frequently accessed memory page based on memory pages decompressed during previous K consecutive times of hot start. For example, when the target running application is hot started for the first time, the first memory page is decompressed from the compressed data, and the first marker bit corresponding to the first memory page is set to 1. Then, when the target running application is hot started for the second time, the first memory page is decompressed from the compressed data, and the first marker bit corresponding to the first memory page is set to 2. When the target running application is hot started for the third time, the first memory page is not decompressed from the compressed data. Assuming that K is set to 3, and the specified threshold is set to 1, the system kernel of the terminal determines the first memory page as the frequently accessed memory page.

It should be noted that after the terminal device determines the frequently accessed memory page, the system kernel of the terminal zeroes out the first marker bit. In the foregoing example, after the terminal determines the first memory page as the frequently accessed memory page, the terminal device zeroes out a marker bit of each memory page, and subsequently, the system kernel of the terminal continues to determine the frequently accessed memory page by using the memory pages decompressed during the previous K consecutive times of hot start.

Step 604: When the target running application is switched to the background for running, the terminal retains the frequently accessed memory page in the memory.

Specifically, the system kernel of the terminal retains a marked memory page in the memory, or retains, in the memory, a memory page whose first marker bit is greater than a specified threshold.

Step 605: The terminal determines a memory page other than the frequently accessed memory page as a rarely accessed memory page of the target running application, and when the target running application is switched to the background for running, the terminal migrates the rarely accessed memory page of the target running application from the memory to a swap partition of a storage.

It should be noted that there is no strict execution sequence between Step 604 and Step 605. Step 604 may be performed before Step 605, or Step 605 may be performed before Step 604.

Specifically, in this step, before the system kernel of the terminal migrates the rarely accessed memory page of the target running application from the memory to the swap partition of the storage, a processor of the terminal first determines whether an I/O (input/output) of the memory is idle. If the I/O (input/output) is idle, the system kernel of the terminal still stores the rarely accessed memory page in the memory in a compressed form. Once it is determined that the I/O is idle, the rarely accessed memory page is migrated to the swap partition of the storage.

Figure 7:
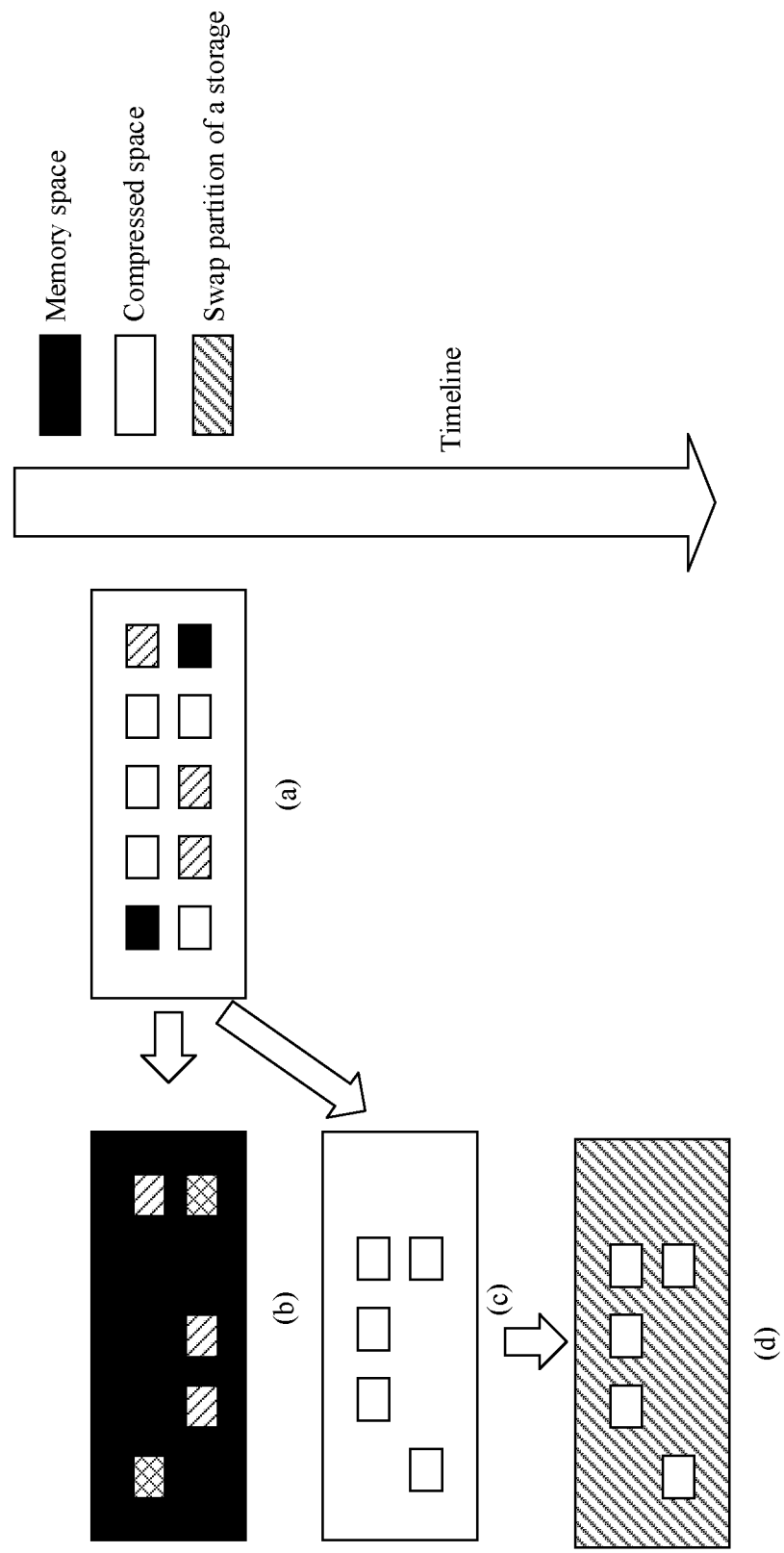
FIG. 7 is a schematic diagram of another memory page swapping scenario according to an embodiment of this application.

The foregoing memory management method is described below by using an example with reference to FIG. 7. For example, as shown in FIG. 7, during hot start of the application, the system kernel of the terminal decompresses a memory page in compressed data, and a memory page obtained through decompression is shown in (b) in FIG. 7. The system kernel of the terminal determines that the memory page obtained through decompression is the frequently accessed memory page, and determines a remaining memory page in a compressed space as the rarely accessed memory page, as shown in (c) in FIG. 7. Further, when the I/O is idle, the system kernel of the terminal migrates the rarely accessed memory page to the swap partition of the storage shown in (d) in FIG. 7.

In this embodiment of this application, a prerequisite for implementing the method is as follows: The target running application that is switched to the background performs a memory compression operation in a process of being switched to the background, to reduce memory consumption of the memory page. In the foregoing method, a frequently accessed memory page required for starting and using the application can be accurately determined based on a feature that some memory pages used for starting and using the application are decompressed during hot start of the application, and the system kernel of the terminal retains, in the memory, the memory page required for starting and using the application, to resolve a problem that freezing occurs when the application that runs in the background is started again, and improve keepalive performance of the application. In another aspect, according to the method, the rarely accessed memory page that needs to be migrated to the swap partition can be accurately filtered out, and the terminal migrates the rarely accessed memory page to the swap partition of the storage, to save memory resources. The swap partition further ensures that data generated during running of the process of the target running application program is not lost.

Scenario 2

Figure 8:
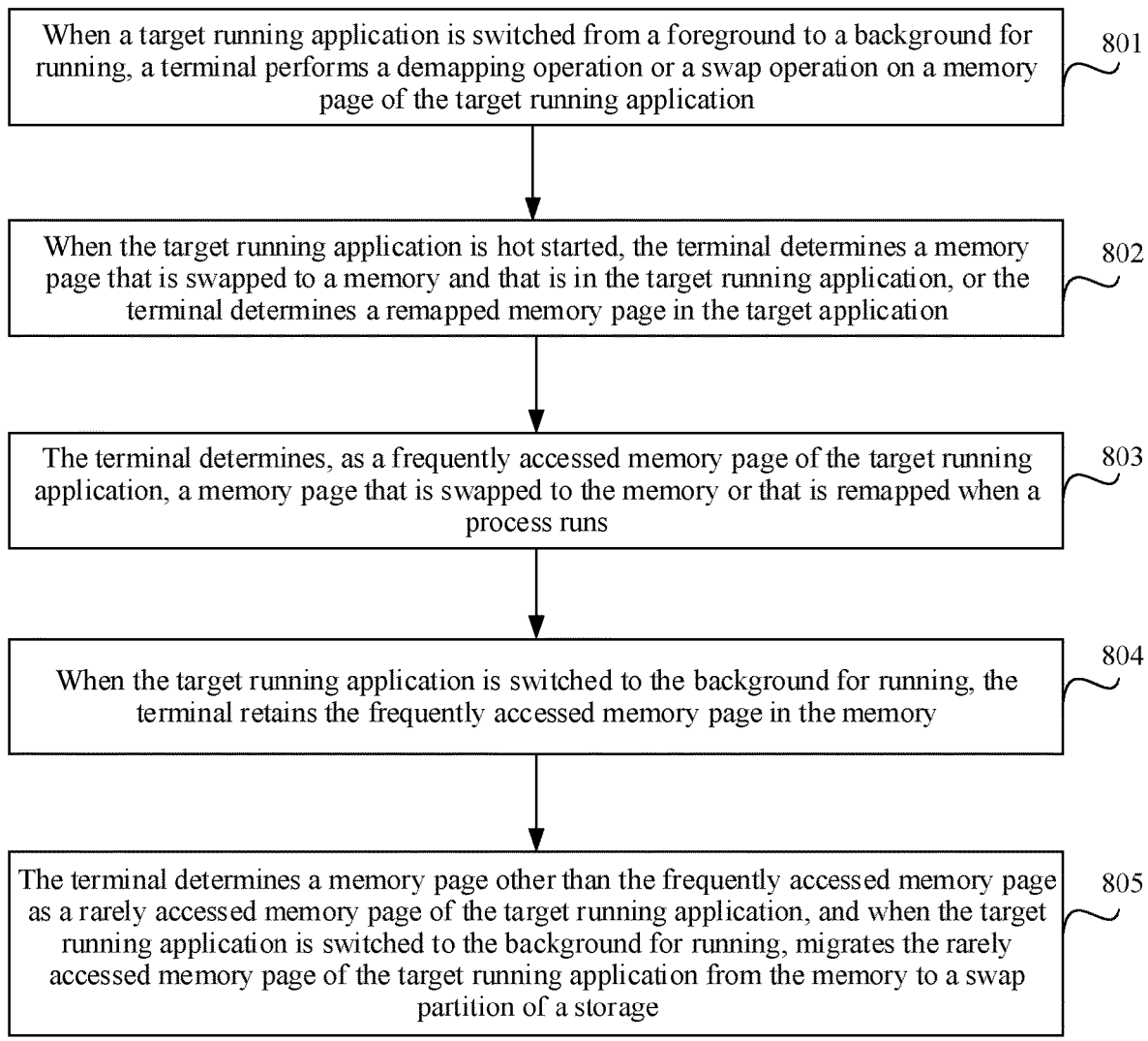
FIG. 8 is a schematic flowchart of a memory management method according to an embodiment of this application.

With reference to FIG. 8, the following describes a procedure of a memory management method according to an embodiment of this application. As shown in FIG. 8, the method specifically includes the following steps.

Step 801: When a target running application is switched from a foreground to a background for running, a terminal performs a demapping operation or a swap operation on a memory page of the target running application.

For a specific example, refer to the foregoing Step 401. Details are not described herein again.

Step 802: When the target running application is hot started, the terminal determines a memory page that is swapped to a memory and that is in the target running application, or the terminal determines a remapped memory page in the target application.

Specifically, in a kernel, each page has a corresponding data structure. In this embodiment of this application, a special marker bit may be added to the data structure. A manner in which the terminal determines a memory page used when a process runs may be as follows: After the application is switched to the background for running for the first time, a system kernel of the terminal sets the special marker bit to 0. Alternatively, when the application is hot started, a system kernel of the terminal sets special marker bits of all used memory pages to 1. In other words, when the target running application is switched from background running to foreground running, the system kernel of the terminal marks a memory page required for starting and using the application. The terminal device may determine, based on mark information, the memory page used when the process runs.

In another possible embodiment, in this application, a first marker bit whose attribute is an enumerated value may be further defined in the data structure corresponding to each memory page. Whenever the target running application is hot started, the system kernel of the terminal increases the enumerated value corresponding to a re-used memory page. Until the target running application is consecutively hot started for the $(K+1)^{th}$ time, the enumerated value of the memory page of the target running application is zeroed out. For example, an initial value of the first marker bit is 0. When the target running application is hot started for the first time, if a first memory page is used, the first marker bit corresponding to the memory page is set to 1. When the target running application is hot started for the second time, if the first memory page is used again, the first marker bit corresponding to the memory page is set to 2. The terminal device may determine a memory page corresponding to a non-zero first marker bit as the memory page used by the process.

For specific descriptions of hot start of the application, cold start of the application, and the memory page, refer to the foregoing Step 603. Details are not described herein again.

Step 803: The terminal determines, as a frequently accessed memory page of the target running application, a memory page that is swapped to the memory or that is remapped when the process runs.

A first method for determining the frequently accessed memory page of the target running application may be as follows: The terminal device determines, as the frequently accessed memory page of the target running application, the memory page that is swapped to the memory or that is remapped when the process runs in this hot start.

In addition, a second method for determining the frequently accessed memory page of the target running application may be as follows: When the terminal is consecutively hot started for the $K^{th}$ time, the system kernel of the terminal determines, based on information about the first marker bit of the memory page, a memory page whose quantity of times of being marked is greater than a specified threshold as the frequently accessed memory page. In other words, the system kernel of the terminal determines the frequently accessed memory page based on memory pages that are swapped to the memory or that are remapped during previous K consecutive times of hot start. For example, when the target running application is hot started for the first time, the first memory page is used, and the first marker bit corresponding to the first memory page is set to 1. Then, when the target running application is hot started for the second time, the first memory page is used, and the first marker bit corresponding to the first memory page is set to 2. When the target running application is hot started for the third time, the first memory page is not used, it is assumed that K is set to 3, and the specified threshold is set to 1, the system kernel of the terminal determines the first memory page as the frequently accessed memory page.

It should be noted that after the terminal device determines the frequently accessed memory page, the system kernel of the terminal zeroes out the first marker bit. In the foregoing example, after the terminal determines the first memory page as the frequently accessed memory page, the terminal device zeroes out a marker bit of each memory page, and subsequently, the system kernel of the terminal continues to determine the frequently accessed memory page by using the memory pages used during the previous K consecutive times of hot start.

Step 804: When the target running application is switched to the background for running, the terminal retains the frequently accessed memory page in the memory.

Specifically, the system kernel of the terminal retains a marked memory page in the memory, or retains, in the memory, a memory page whose first marker bit is greater than a specified threshold.

Step 805: The terminal determines a memory page other than the frequently accessed memory page as a rarely accessed memory page of the target running application, and when the target running application is switched to the background for running, the terminal migrates the rarely accessed memory page of the target running application from the memory to a swap partition of a storage.

It should be noted that there is no strict execution sequence between Step 804 and Step 805. Step 804 may be performed before Step 805, or Step 805 may be performed before Step 804.

Specifically, in this step, before the system kernel of the terminal migrates the rarely accessed memory page of the target running application from the memory to the swap partition of the storage, a processor of the terminal first determines whether an I/O (input/output) of the memory is idle. If the I/O (input/output) is idle, the system kernel of the terminal still stores the rarely accessed memory page in the memory in a compressed form. Once it is determined that the I/O is idle, the rarely accessed memory page is migrated to the swap partition of the storage.

In this embodiment of this application, in the method, it is not limited that a compression operation needs to be performed when the target running application is switched to the background for running. The system kernel of the terminal can accurately determine, by determining whether a memory page is used, the frequently accessed memory page and the rarely accessed memory page that are required for starting and using the application. An implementation is flexible. The system kernel of the terminal retains, in the memory, the memory page required for starting and using the application, to resolve a problem that freezing occurs when the application that runs in the background is started again, and improve keepalive performance of the application. In another aspect, according to the method, the rarely accessed memory page that needs to be migrated to the swap partition can be accurately filtered out, and the terminal migrates the rarely accessed memory page to the swap partition of the storage, to save memory resources. The swap partition further ensures that data generated during the running of the process of the target running application program is not lost.

It should be noted that the method provided in the foregoing embodiments may be combined with a current memory overcommitment technology. For example, the current memory overcommitment technology includes memory deduplication, a ballooning (ballooning) technology, a transcendent memory (transcendent memory) technology, a SWAP (swap) technology, and the like. This is not limited in this embodiment of this application.

Figure 9:
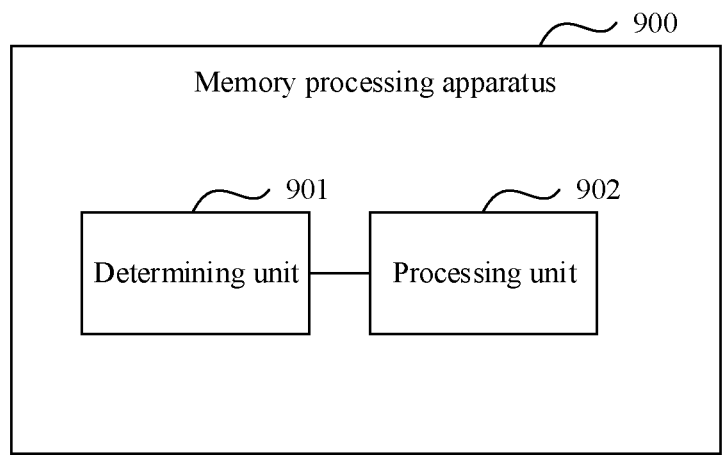
FIG. 9 is a schematic diagram of a memory management apparatus according to an embodiment of this application.

Based on the foregoing embodiments, an embodiment of this application provides a memory management apparatus. The apparatus is applied to a terminal device, and is configured to implement the memory management method shown in FIG. 4. As shown in FIG. 9, the apparatus 900 includes a determining unit 901 and a processing unit 902.

The determining unit 901 is configured to: when a target running application is hot started, determine a frequently accessed memory page of the target running application based on a memory page on which a page exception occurs in the target running application.

The processing unit 902 is configured to: after the target running application is switched to a background for running, retain the frequently accessed memory page in a memory, and swap a rarely accessed memory page from the memory to a swap partition of a storage.

In a possible design, the determining unit 901 is configured to determine an application that runs in the background as the target application, or the determining unit 901 is configured to determine the target running application based on an identifier that is of an application and that is set by a user.

In a possible design, that the target running application is hot started means that the target running application is switched from background running to foreground running. A start moment corresponding to hot start of the target running application may be a first moment at which a process of the target running application is started to be switched from background running to foreground running. The determining unit 901 is configured to use a time period corresponding to second duration after the first moment as a time period corresponding to a hot start process. The second duration may be a specified threshold, or may be determined based on status information of the target running application.

In a possible implementation, when the target running application is decompressed, a decompressed memory page in the target running application is determined as the frequently accessed memory page of the target running application.

In a possible implementation, when a swap operation is performed on a memory page in the target running application, a memory page that is swapped to the memory and that is in the target running application is determined as the frequently accessed memory page of the target running application.

In a possible implementation, when a memory page in the target running application is remapped, a remapped memory page in the target running application is determined as the frequently accessed memory page of the target running application.

In another possible implementation, whenever the target running application is hot started, the processing unit 902 is configured to mark the decompressed memory page in compressed data, and determine a marked memory page as the frequently accessed memory page of the target running application; or mark the memory page that is swapped to the memory and that is in the target running application, and determine a marked memory page as the frequently accessed memory page of the target running application; or mark the remapped memory page in the target running application, and determine a marked memory page as the frequently accessed memory page of the target running application.

In a possible implementation, the processing unit 902 is specifically configured to: perform a swap operation on a memory page of the target running application; and retain the frequently accessed memory page in the memory when the memory page of the target running application is the frequently accessed memory page; or swap the rarely accessed memory page from the memory to the swap partition of the storage when the memory page of the target running application is the rarely accessed memory page.

In a possible implementation, the processing unit 902 is further configured to: swap the frequently accessed memory page from the memory to the swap partition of the storage after running duration since the target running application is switched to the background for running reaches first duration.

In a possible implementation, only when determining that an I/O of the memory is idle, the processing unit 902 migrates the rarely accessed memory page of the target running application from the memory to the swap partition of the storage; otherwise, the processing unit 902 retains the rarely accessed memory page in the memory.

In a possible implementation, the processing unit 902 swaps the frequently accessed memory page from the memory to the swap partition of the storage when the process of the target running application is killed.

According to the memory management apparatus provided in this embodiment of the present invention, a frequently accessed memory page required for starting and using the application can be accurately determined based on a feature that some memory pages used for starting and using the application are in a page missing exception during the hot start of the application, and a system kernel of a terminal retains, in the memory, the memory page required for starting and using the application, to resolve a problem that freezing occurs when the application that runs in the background is started again, and improve keepalive performance of the application. In another aspect, according to the method, the rarely accessed memory page that needs to be migrated to the swap partition can be accurately filtered out, and the terminal migrates the rarely accessed memory page to the swap partition of the storage, to save memory resources. The swap partition further ensures that data generated during the running of the process of the target running application program is not lost.

It should be noted that, in this embodiment of this application, division into the units is an example, and is merely a logical function division. In actual implementation, another division manner may be used. Functional units in embodiments of this application may be integrated into one processing unit, or each of the units may exist alone physically, or two or more units may be integrated into one unit. The foregoing integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes a plurality of instructions for instructing a computer device (which may be, for example, a personal computer, a server, or a network device) or a processor (processor) to perform all or some of the steps of the methods described in embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

Figure 10:
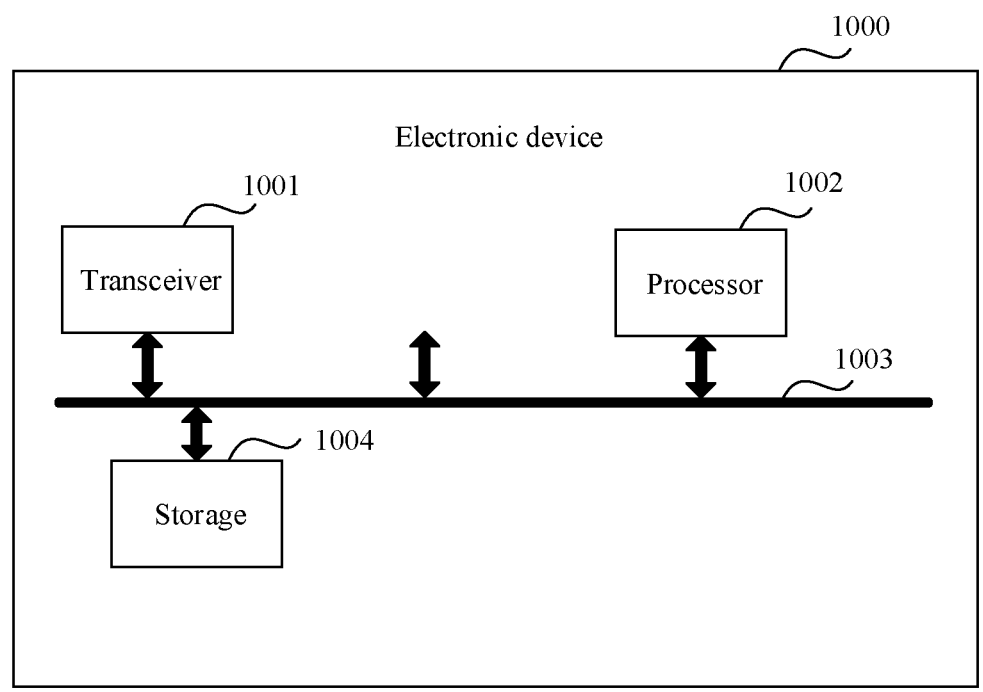
FIG. 10 is a schematic diagram of a structure of a terminal according to an embodiment of this application.

Based on the foregoing embodiments, an embodiment of the present invention further provides a terminal device that is configured to implement the memory management method shown in FIG. 4, FIG. 6, or FIG. 8, and that has a function of the memory management apparatus 900 shown in FIG. 9. As shown in FIG. 10, the terminal device 1000 includes a transceiver 1001, a processor 1002, a bus 1003, and a storage 1004.

The transceiver 1001, the processor 1002, and the storage 1004 are connected to each other through the bus 1003. The bus 1003 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is for representing the bus in FIG. 10, but this does not mean that there is only one bus or only one type of bus.

The transceiver 1001 is configured to communicate and interact with another device.

The processor 1002 is configured to implement the memory management method shown in FIG. 4, the memory management method shown in FIG. 6, or the memory management method shown in FIG. 8.

In this embodiment of this application, in the method, it is not limited that a compression operation needs to be performed when a target running application is switched to a background for running. A system kernel of a terminal can accurately determine, by determining whether a memory page is used, a frequently accessed memory page and a rarely accessed memory page that are required for starting and using the application. An implementation is flexible. The system kernel of the terminal retains, in a memory, a memory page required for starting and using the application, to resolve a problem that freezing occurs when the application that runs in the background is started again, and improve keepalive performance of the application. In another aspect, according to the method, the rarely accessed memory page that needs to be migrated to a swap partition can be accurately filtered out, and the terminal migrates the rarely accessed memory page to the swap partition of a storage, to save memory resources. The swap partition further ensures that data generated during running of a process of the target running application program is not lost.

An embodiment of this application further provides a computer storage medium. The computer storage medium stores computer instructions. When the computer instructions are run on a terminal device, the terminal device is enabled to perform the foregoing related method steps, to implement the method in the foregoing embodiments.

An embodiment of this application further provides a computer program product. When the computer program product runs on a computer, the computer is enabled to perform the foregoing related steps, to implement the method in the foregoing embodiments.

In addition, an embodiment of this application further provides an apparatus. The apparatus may be specifically a chip, a component, or a module. The apparatus may include a processor and a storage that are connected. The storage is configured to store computer-executable instructions. When the apparatus runs, the processor may execute the computer-executable instructions stored in the storage, to enable the chip to perform the method in the foregoing method embodiments.

Based on the descriptions of the foregoing implementations, it may be understood by a person skilled in the art that, for ease and brevity of description, division of the foregoing function modules is merely used as an example for description. In actual application, the foregoing functions may be allocated to different function modules for implementation according to a requirement, that is, an internal structure of the apparatus is divided into different function modules, to implement all or some of the functions described above.

In the several embodiments provided in this application, it should be understood that the disclosed apparatuses and methods may be implemented in other manners. For example, the described apparatus embodiment is merely an example. For example, division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The foregoing integrated unit may be implemented in a form of hardware, or may be implemented in a form of a software functional unit.

When being implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium, and includes a plurality of instructions for instructing a device (which may be a single-chip microcomputer, a chip, or the like) or a processor (processor) to perform all or some of the steps of the method in embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A memory management method, applied to a terminal, comprising:
   before a first application is hot started,
   one of:
   compressing, by the terminal, memory pages in the first application when the first application is switched to a background for running; or
   performing, by the terminal, a swap operation on memory pages in the first application when the first application is switched to the background for running; or remapping, by the terminal, memory pages in the first application when the first application is switched to the background for running;
   when the first application is hot started, determining a first memory page on which a page exception occurs in the first application;
   and after the first application is switched to the background for running, retaining the first memory page in a memory, and swapping a second memory page of the first application from the memory to a swap partition of a storage,
   wherein the second memory page is a memory page other than the first memory page.

2. The method according to claim 1, wherein the determining the first memory page on which the page exception occurs in the first application comprises:
   when the first application is decompressed, determining a decompressed memory page in the first application, and on which the page exception occurs, as the first memory page of the first application; or
   when a swap operation is performed on a memory page in the first application, determining the memory page that is swapped to the memory and that is in the first application, and on which the page exception occurs, as the first memory page of the first application; or
   when a memory page in the first application is remapped, determining the remapped memory page in the first application, and on which the page exception occurs, as the first memory page of the first application.

3. The method according to claim 1, wherein the determining the first memory page of the first application comprises:
   marking a decompressed memory page in the first application on which the page exception occurs, and determining the marked memory page as the first memory page of the first application; or
   marking a memory page that is swapped to the memory and that is in the first application, and on which the page exception occurs, and determining the marked memory page as the first memory page of the first application; or
   marking a remapped memory page in the first application on which the page exception occurs, and determining the marked memory page as the first memory page of the first application.

4. The method according to claim 1, wherein the retaining the first memory page in the memory, and swapping the second memory page from the memory to the swap partition of the storage comprises:
   performing a swap operation on a memory page of the first application.

5. The method according to claim 1, wherein the method further comprises:
    swapping the first memory page from the memory to the swap partition of the storage after a running duration, beginning when the first application is switched to the background for running, reaches a preset first duration.
6. The method according to claim 1, wherein the swapping the second memory page from the memory to the swap partition of the storage comprises:
    determining whether an input/output (I/O) of the memory is idle; and
    swapping the second memory page from the memory to the swap partition of the storage when the I/O of the memory is determined to be idle.
7. The method according to claim 1, further comprising:
    determining an application that runs in a background as a first application; or
    determining a first application based on an identifier that is of an application and that is set by a user.
8. The method according to claim 1, wherein that the first application is hot started means that the first application is switched from background running to foreground running.
9. The method according to claim 1, wherein when the first application is hot started, the method comprises:
    determining that a first moment at which a process of the first application is started to be switched from background running to foreground running is within a time period corresponding to second duration after the first moment, wherein
    the second duration is a specified threshold, or the second duration is determined based on status information of the first application.
10. The method according to claim 1, further comprising:
    swapping the first memory page from the memory to the swap partition of the storage when the process of the first application is killed.
11. A terminal, wherein the terminal comprises a display, a processor, and a storage;
    the storage stores program instructions; and
    the processor is configured to run the program instructions stored in the storage, to enable the terminal to perform the following steps:
    before a first application is hot started,
    one of:
    compressing, by the terminal, memory pages in a first application when the first application is switched to a background for running; or
    performing, by the terminal, a swap operation on memory pages in the first application when the first application is switched to the background for running;
    or remapping, by the terminal, memory pages in the first application when the first application is switched to the background for running;
    when the first application is hot started, determining a first memory page on which a page exception occurs in the first application;
    and after the first application is switched to the background for running, retaining the first memory page in a memory, and swapping a second memory page of the first application from the memory to a swap partition of a storage,
    wherein the second memory page is a memory page other than the first memory page.
12. A non-transitory computer-readable medium computer-usable memory, wherein the non-transitory computer-readable medium computer-usable memory comprises program instructions, and when the program instructions are run on a processor, the processor is enabled to perform the following steps:
    compressing, by the terminal, memory pages in a first application when the first application is switched to a background for running;
    or performing, by the terminal, a swap operation on memory pages in the first application when the first application is switched to the background for running;
    or remapping, by the terminal, memory pages in the first application when the first application is switched to the background for running;
    when the first application is hot started, determining a first memory page on which a page exception occurs in the first application;
    and after the first application 1s switched to the background for running, retaining the first memory page in a memory, and swapping a second memory page of the first application from the memory to a swap partition of a storage,
    wherein the second memory page is a memory page other than the first memory page.
13. The terminal according to claim 11, wherein the determining the first memory page on which the page exception occurs in the first application comprises:
    when the first application is decompressed, determining a decompressed memory page in the first application, and on which the page exception occurs, as the first memory page of the first application; or
    when a swap operation is performed on a memory page in the first application, determining the memory page that is swapped to the memory and that is in the first application, and on which the page exception occurs, as the first memory page of the first application; or
    when a memory page in the first application is remapped, determining the remapped memory page in the first application, and on which the page exception occurs, as the first memory page of the first application.
14. The terminal according to claim 11, wherein the determining the first memory page of the first application comprises:
    marking a decompressed memory page in the first application on which the page exception occurs, and determining the marked memory page as the first memory page of the first application; or
    marking a memory page that is swapped to the memory and that is in the first application, and on which the page exception occurs, and determining the marked memory page as the first memory page of the first application; or
    marking a remapped memory page in the first application on which the page exception occurs, and determining the marked memory page as the first memory page of the first application.
15. The terminal according to claim 11, wherein the retaining the first memory page in the memory, and swapping the second memory page from the memory to the swap partition of the storage comprises:
    performing a swap operation on a memory page of the first application.
16. The terminal according to claim 11, wherein the processor is configured to run the program instructions, to enable the terminal to further perform:
    swapping the first memory page from the memory to the swap partition of the storage after a running duration, beginning when the first application is switched to the background for running, reaches a preset first duration.

17. The non-transitory computer-readable medium according to claim 12, wherein the determining the first memory page on which the page exception occurs in the first application comprises:
- when the first application is decompressed, determining a decompressed memory page in the first application, and on which the page exception occurs, as the first memory page of the first application; or
- when a swap operation is performed on a memory page in the first application, determining the memory page that is swapped to the memory and that is in the first application, and on which the page exception occurs, as the first memory page of the first application; or
- when a memory page in the first application is remapped, determining the remapped memory page in the first application, and on which the page exception occurs, as the first memory page of the first application.

18. The non-transitory computer-readable medium according to claim 12, wherein the determining the first memory page of the first application comprises:
- marking a decompressed memory page in the first application on which the page exception occurs, and determining the marked memory page as the first memory page of the first application; or
- marking a memory page that is swapped to the memory and that is in the first application, and on which the page exception occurs, and determining the marked memory page as the first memory page of the first application; or
- marking a remapped memory page in the first application on which the page exception occurs, and determining the marked memory page as the first memory page of the first application.

19. The non-transitory computer-readable medium according to claim 12, wherein the retaining the first memory page in the memory, and swapping the second memory page from the memory to the swap partition of the storage comprises:
- performing a swap operation on a memory page of the first application.

* * * * *